（12）United States Patent
Piao et al.

(10) Patent No.: US 11,335,909 B2
(45) Date of Patent: May 17, 2022

(54) NEGATIVE ELECTRODE ACTIVE MATERIAL FOR ELECTROCHEMICAL DEVICE, NEGATIVE ELECTRODE INCLUDING THE NEGATIVE ELECTRODE ACTIVE MATERIAL AND ELECTROCHEMICAL DEVICE INCLUDING THE SAME

(71) Applicant: LG CHEM, LTD., Seoul (KR)

(72) Inventors: Lilin Piao, Daejeon (KR); Eun-Kyung Kim, Daejeon (KR); Ju-Ho Chung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 348 days.

(21) Appl. No.: 16/604,963

(22) PCT Filed: Oct. 30, 2018

(86) PCT No.: PCT/KR2018/013040
§ 371 (c)(1),
(2) Date: Oct. 11, 2019

(87) PCT Pub. No.: WO2019/088672
PCT Pub. Date: May 9, 2019

(65) Prior Publication Data
US 2020/0185719 A1  Jun. 11, 2020

(30) Foreign Application Priority Data

Oct. 30, 2017 (KR) .................. 10-2017-0142709

(51) Int. Cl.
*H01M 4/00* (2006.01)
*H01M 4/587* (2010.01)
(Continued)

(52) U.S. Cl.
CPC ............ *H01M 4/587* (2013.01); *H01G 11/24* (2013.01); *H01G 11/42* (2013.01); *H01M 4/364* (2013.01);
(Continued)

(58) Field of Classification Search
CPC ........... H01M 4/133; H01M 2004/021; H01M 4/587; H01M 10/0525; H01G 11/24; Y02E 60/10
See application file for complete search history.

(56) References Cited

U.S. PATENT DOCUMENTS 6,300,013 B1    10/2001  Yamada et al.
2004/0023115 A1  2/2004  Kato et al.
(Continued)

FOREIGN PATENT DOCUMENTS

CN    1272698 A     11/2000
CN    103843179 B   12/2017
(Continued)

OTHER PUBLICATIONS

European Search Report for Appl. No. 18872807.5 dated Jun. 19, 2020.
(Continued)

*Primary Examiner* — Cynthia H Kelly
*Assistant Examiner* — Monique M Wills
(74) *Attorney, Agent, or Firm* — Birch, Stewart, Kolasch & Birch, LLP (57) ABSTRACT

A negative electrode active material for an electrochemical device which has improved quick charging characteristics. The negative electrode active material includes two types of graphite particles having a different particle diameter and shows a bimodal distribution, wherein the ratio of the
(Continued)

average particle diameter ($D_{50}$) of the first graphite particles to the average particle diameter ($D_{50}$) of the second graphite particles is larger than 1.7.

12 Claims, 5 Drawing Sheets (51) Int. Cl.
H01G 11/24 (2013.01)
H01G 11/42 (2013.01)
H01M 4/36 (2006.01)
H01M 10/0525 (2010.01)
H01M 4/02 (2006.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2006/0073387 A1 | 4/2006 | Sakagoshi et al. | |
| 2012/0021294 A1* | 1/2012 | Zhamu | H01B 1/122 |
| | | | 429/231.8 |
| 2012/0052393 A1 | 3/2012 | Kameda et al. | |
| 2012/0148922 A1* | 6/2012 | Takahashi | H01M 10/052 |
| | | | 429/231.8 |
| 2013/0140488 A1 | 6/2013 | Sotowa et al. | |
| 2013/0164618 A1 | 6/2013 | Konishi | |
| 2014/0212750 A1 | 7/2014 | Ahn et al. | |
| 2014/0227588 A1 | 8/2014 | Kim et al. | |
| 2014/0248528 A1 | 9/2014 | Takahata et al. | |
| 2016/0181612 A1 | 6/2016 | Lee et al. | |
| 2018/0190985 A1 | 7/2018 | Choi et al. | |

FOREIGN PATENT DOCUMENTS

| | | |
|---|---|---|
| JP | 4252846 B2 | 4/2009 |
| JP | 2010-73618 A | 4/2010 |
| JP | 2010-251315 A | 11/2010 |
| JP | 2013-030355 A | 2/2013 |
| JP | 2015-164143 A | 9/2015 |
| KR | 10-0326446 B1 | 2/2002 |
| KR | 10-2007-0040853 A | 4/2007 |
| KR | 10-2013-0041227 A | 4/2013 |
| KR | 10-1323179 B1 | 10/2013 |
| KR | 10-2014-0072132 A | 6/2014 |
| KR | 10-2014-0141861 A | 12/2014 |
| KR | 10-2015-0073107 A | 6/2015 |
| KR | 10-2017-0039976 A | 4/2017 |
| WO | WO 2014/119960 A1 | 8/2014 |
| WO | WO 2017/111542 A1 | 6/2017 |

OTHER PUBLICATIONS

International Search Report for PCT/KR2018/013040 (PCT/ISA/210) dated Feb. 19, 2019.

* cited by examiner

NEGATIVE ELECTRODE ACTIVE MATERIAL FOR ELECTROCHEMICAL DEVICE, NEGATIVE ELECTRODE INCLUDING THE NEGATIVE ELECTRODE ACTIVE MATERIAL AND ELECTROCHEMICAL DEVICE INCLUDING THE SAME

TECHNICAL FIELD

The present application claims priority to Korean Patent Application No. 10-2017-0142709 filed on Oct. 30, 2017 in the Republic of Korea, the disclosures of which are incorporated herein by reference. The present disclosure relates to a negative electrode active material for an electrochemical device, a negative electrode including the negative electrode active material and an electrochemical device including the same.

BACKGROUND ART

As technological development and a need for mobile instruments have increased, a demand for secondary batteries as energy sources has increased rapidly. Among such secondary batteries, lithium secondary batteries which show high energy density and operating potential and have long cycle life and a low self-discharging rate have been commercialized and used widely.

Recently, a secondary battery is a representative example of such electrochemical devices using electrochemical energy. In addition, the application spectrum of such a secondary battery tends to be increased more and more. More recently, as technological development and demand for portable instruments, such as portable computers, cellular phones and cameras, have been increased, secondary batteries have been increasingly in demand as energy sources for such portable instruments. Among such electrochemical devices, lithium secondary batteries which show high energy density and operating potential and have long cycle life and a low self-discharging rate have been commercialized and used widely.

In general, a lithium secondary battery includes a positive electrode, a negative electrode and an electrolyte. In addition, lithium ions deintercalated from a positive electrode active material upon the first charging are intercalated into a negative electrode active material, such as carbon particles, and deintercalated again upon discharging. In this manner, charging/discharging is allowed, since lithium ions reciprocate between the positive electrode and the negative electrode while transferring energy.

For example, a lithium secondary battery includes an electrode assembly provided with a positive electrode including a lithium transition metal oxide as an electrode active material, a negative electrode including a carbonaceous active material and a porous separator, and a lithium electrolyte injected thereto.

The positive electrode is obtained by coating aluminum foil with a positive electrode mixture containing a lithium transition metal oxide, and the negative electrode is obtained by coating copper foil with a negative electrode mixture containing a carbonaceous active material.

Meanwhile, as a need for a secondary battery having high capacity and quick charging characteristics has been increasingly in demand recently, researches into inhibition of lithium (Li)-plating and improvement of diffusion characteristics are also increasingly in demand.

Upon quick charging, lithium plating may occur on the surface of a negative electrode and the deposited lithium may cause deterioration of a cell. Particularly, when the loading amount of an electrode is increased, lithium plating caused by accumulation of lithium on the surface of an electrode becomes severe as compared to the amount of lithium ions diffused into the electrode through the pores thereof upon the application of electric current at the same C-rate.

Therefore, there is a need for developing a negative electrode capable of improving quick charging characteristics even in a high-loading electrode.

DISCLOSURE

Technical Problem

The present disclosure is directed to providing a negative electrode active material having excellent high-rate charging and quick charging characteristics and a negative electrode including the same. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To solve the above-mentioned technical problem, the present disclosure provides a negative electrode active material and a negative electrode. According to the first embodiment of the present disclosure, there is provided a negative electrode active material which includes the first graphite particles and the second graphite particles, wherein the first graphite particles have an average particle diameter ($D_{50}$) of 15 μm to 25 μm, the second graphite particles have an average particle diameter ($D_{50}$) of 4 μm to 11 μm, the first graphite particles and the second graphite particles have a bimodal distribution, and the ratio of the average particle diameter ($D_{50}$) of the first graphite particles to the average particle diameter ($D_{50}$) of the second graphite particles is larger than 1.7.

According to the second embodiment of the present disclosure, there is provided the negative electrode active material as defined in the first embodiment, wherein the first and the second graphite particles have an orientation index of less than 35, defined as an area ratio of a (004) surface to a (110) surface, wherein the (110) surface and (004) surface of the particles are measured with X-ray diffractometry (XRD) and integration of peak intensities from the X-ray diffractometry.

According to the third embodiment of the present disclosure, there is provided the negative electrode active material as defined in any one of the first and the second embodiments, wherein $R_S$ and $R_B$ are ratios ($R_R$) of D band peak intensity (1358 $cm^{-1}$) to G band peak intensity (1580 $cm^{-1}$) showing a degree of crystallization in Raman spectroscopy, wherein a ratio $R_S$ of the second graphite particles to $R_B$ of the first graphite particles, $R_S/R_B$, is 0.03-0.82.

According to the fourth embodiment of the present disclosure, there is provided the negative electrode active material as defined in any one of the first to the third embodiments, wherein the ratio ($R_R$) is 0.19-0.60.

According to the fifth embodiment of the present disclosure, there is provided the negative electrode active material as defined in any one of the first to the fourth embodiments, wherein the ratio of $R_S/R_B$ is 0.03-0.82, and $R_S$ is 0.03-0.200.

According to the sixth embodiment of the present disclosure, there is provided the negative electrode active material as defined in any one of the first to the fifth embodiments, wherein the ratio of $R_S/R_B$ is 0.03-0.82, and $R_B$ is 0.146-1.000.

According to the seventh embodiment of the present disclosure, there is provided the negative electrode active material as defined in any one of the first to the sixth embodiments, wherein the first graphite particles are present in an amount of 50 wt % to 99 wt % based on 100 wt % of the negative electrode active material.

According to the eighth embodiment of the present disclosure, there is provided the negative electrode active material as defined in any one of the first to the seventh embodiments, wherein the first graphite particles have a specific surface area of 0.01 m²/g to 1.9 m²/g.

According to the ninth embodiment of the present disclosure, there is provided the negative electrode active material as defined in any one of the first to the eighth embodiments, wherein the second graphite particles have a specific surface area of 0.05 m²/g to 2.6 m²/g.

According to the tenth embodiment of the present disclosure, there is provided the negative electrode active material as defined in any one of the first to the ninth embodiments, wherein each of the first graphite particle and the second graphite particle is independently at least one selected from the group consisting of natural graphite, artificial graphite, graphitized carbon fibers, graphitized mesocarbon microbeads and amorphous carbon.

According to the eleventh embodiment of the present disclosure, there is provided a negative electrode for an electrochemical device including the negative electrode active material as defined in any one of the first to the tenth embodiments.

According to the twelfth embodiment of the present disclosure, there is provided the negative electrode as defined in the eleventh embodiment, which has an orientation index, defined by an area ratio ((004 surface)/(110 surface)) of the first and the second graphite particles contained in the negative electrode, less than 35.

According to the thirteenth embodiment of the present disclosure, there is provided an electrochemical device including a positive electrode, a negative electrode and a separator interposed between the positive electrode and the negative electrode, wherein the negative electrode includes the negative electrode active material as defined in any one of the first to the tenth embodiments.

Advantageous Effects

The negative electrode including the negative electrode active material according to the present disclosure is capable of high-rate charging and quick charging.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or proportions of some elements in the drawings may be exaggerated for the purpose of clearer description.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also one portion is connected electrically to another portion' by way of the other element interposed between them.

Throughout the specification, the expression 'a part ⌜includes⌟ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The present disclosure relates to a negative electrode active material for an electrochemical device and a negative electrode including the same. The present disclosure also relates to an electrochemical device including the negative electrode. Herein, the electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

According to the present disclosure, the negative electrode active material provides a shortened lithium ion conduction path and an increased electrolyte infiltration area, thereby providing excellent high-rate and quick charging characteristics.

Hereinafter, the present disclosure will be explained in detail.

The negative electrode active material according to the present disclosure includes two types of graphite particles having a different particle diameter and shows a bimodal distribution. According to an embodiment of the present disclosure, the negative electrode active material includes the first graphite particles (large-diameter particles) and the second graphite particles (small-diameter particles), wherein the first graphite particles have a particle diameter ($D_{50}$) of 15-25 μm, the second graphite particles have a particle diameter ($D_{50}$) of 4-11 μm, and the ratio of particle diameter ($D_{50}$) of the first graphite particles/particle diameter ($D_{50}$) of the second graphite particles is larger than 1.7. According to another embodiment of the present disclosure, the particle diameter ($D_{50}$) of the first graphite particles preferably satisfies a range of 20.3±5 μm.

In the case of the first graphite particles, an excessively large particle size beyond the above-defined range may cause degradation of charging characteristics due to an increase in lithium ion conduction path. In addition, a particle size less than the above-defined range causes insufficient assemblage during the assemblage of the secondary particles, thereby adversely affecting quick charging characteristics.

Meanwhile, in the case of the second graphite particles, a particle size less than the above-defined range may adversely affect the manufacture of a high-density electrode, since the pressing characteristics of an electrode may be degraded. Meanwhile, an excessively large particle size beyond the above-defined range may cause degradation of quick charging characteristics. In addition, according to the present disclosure, a particle diameter ratio of 1.7 or less shows an increase in content of large-diameter particles or a decrease in content of small-diameter particles, resulting in degradation of quick charging characteristics.

The particle diameter ($D_{50}$) of the negative electrode active material means a particle diameter ($D_{50}$) corresponding to 50% of the accumulated value from smaller particles calculated based on the results of determining the particle size distribution of the particles after classification using a general particle size distribution analyzer. Such a particle size distribution may be determined by a diffraction or scattering intensity pattern through a particle size analyzer, such as Microtrac 9220FRA or Microtrac HRA available from the Nikkiso Company.

According to the related art, an electrolyte cannot be diffused well into an electrode, and thus a large amount of dendrite tends to be formed on the surface of the electrode.

However, according to the present disclosure, the particle porosity and pore size are increased by virtue of the particle distribution of the electrode active material and an electrolyte may be diffused into the electrode active material particles and electrode with ease, thereby providing improved wettability with the electrolyte. In addition, the lithium ion conduction path is shortened effectively. Therefore, according to the present disclosure, high-rate and quick charging is allowed and formation of lithium dendrite is reduced.

According to an embodiment of the present disclosure, the negative electrode preferably has the following orientation index. The orientation index means a direction along which the crystal structure of the graphite particles (including large-diameter particles and small-diameter particles) contained in the negative electrode is aligned, and may be determined by X-ray diffractometry (XRD). According to an embodiment of the present disclosure, the orientation index of the negative electrode is an area ratio ((004)/(110)) obtained by manufacturing a negative electrode as described in the following Examples, analyzing (110) surface and (004) surface of the negative electrode active material particles contained in the negative electrode and integrating the peak intensities of (110) surface and (004) surface of the particles contained in the negative electrode. According to the present disclosure, the negative electrode preferably has an orientation index less than 35. The orientation index may be larger than 0 or equal to or more than 3 within the above-defined range. When the orientation index is less than 35 according to the present disclosure, a number of lithium ion intercalation/deintercalation paths are increased. Therefore, Rct (charge transfer resistance) is decreased, and thus quick-charging characteristics are improved.

More particularly, XRD is carried out under the following conditions:

Target: Cu (Kα-ray) graphite monochromator
Slit: divergence slit=1°, convergence slit=0.1 mm, scattering slit=1°
Determination region and step angle/determination time:
(110) Surface: 76.5°<2θ<78.5°, 0.01°/3 sec
(004) Surface: 53.5°<2θ<56.0°, 0.01°/3 sec
Herein 2θ means a diffraction angle.

The above-mentioned XRD analysis is a typical example and another method may also be used. It is possible to determine the orientation index of the negative electrode as described above.

According to the present disclosure, the first graphite particles are present in an amount of 20-99 wt % based on 100 wt % of the negative electrode active material. According to an embodiment of the present disclosure, the first graphite particles may be used in an amount of 30 wt % or more, or 50 wt % or more, within the above-defined range. In addition, the first graphite particles may be used in an amount of 90 wt % or less, 80 wt % or less, or 70 wt % or less, within the above-defined range.

According to an embodiment of the present disclosure, the first graphite particles have a specific surface area of 0.01-1.9 $m^2$/g. Particularly, the specific surface area may be 0.1 $m^2$/g or more, 0.5 $m^2$/g or more, or 1 $m^2$/g or more. In addition, according to another embodiment of the present disclosure, the second graphite particles have a specific surface area of 0.05-2.6 $m^2$/g. Particularly, the specific area may be 0.5 $m^2$/g or more, 1 $m^2$/g or more, or 2 $m^2$/g or more.

When each specific surface area is beyond the above-defined range, side reactions are increased to cause degradation of the efficiency of a battery. Particularly, when each specific surface area is increased excessively beyond the above-defined range, irreversible reaction with an electrolyte is increased to cause a decrease in the initial battery efficiency.

Meanwhile, according to the present disclosure, the specific surface area may be determined by the BET 6-point method through nitrogen gas adsorption flowmetry using a mercury porosimeter or porosimetry analyzer (Bell Japan Inc., Belsorp-II mini).

According to the present disclosure, each of the first graphite particle and the second graphite particle is at least one selected from the group consisting of natural graphite, artificial graphite, kish graphite, graphitized carbon fibers, graphitized mesocarbon microbeads and amorphous carbon.

In addition, according to the present disclosure, the graphite particles may include those obtained by graphitization of at least one selected from the group consisting of soft carbon, hard carbon, pyrolytic carbon, mesophase pitch based carbon fibers, mesocarbon microbeads, mesophase pitches, petroleum or coal tar pitch derived cokes and activated carbon.

According to an embodiment of the present disclosure, the ratio ($R_R$) of degree of crystallization of the Raman spectrum of the second graphite particles to that of the Raman spectrum of the first graphite particles is 0.03-0.82. The ratio ($R_R$) of degree of crystallization may be 0.01 or more, or 0.19 or more and 0.7 or less, 0.60 or less, or 0.5 or less, within the above-defined range. For example, the ratio ($R_R$) of degree of crystallization may be 0.19-0.60.

The degree of crystallization (R) of the Raman spectrum of each of the first graphite particles and the second graphite particles may be represented by [$R=I_{1350}/I_{1580}$]. Herein, $I_{1350}$ means the Raman intensity at around 1350 $cm^{-1}$ and $I_{1580}$ means the Raman intensity at around 1580 $cm^{-1}$. According to the present disclosure, as the degree (R) of crystallization of the Raman spectrum approaches 0, it is though that the graphite particles are close to perfect crystals. According to the present disclosure, the ratio ($R_R$) of degree of crystallization means $R_S/R_B$ when the R value of the first graphite particles is taken as $R_B$ and that of the second graphite particles is taken as $R_S$. As described hereinafter. Comparative Examples show a $R_R$ value of 0.82 or more, while Examples show a $R_R$ value of 0.47 or less, which is relatively smaller as compared to Comparative Examples. According to an embodiment of the present disclosure, $R_S$ may be 0.030-0.200 within the above-defined range of $R_R$. In addition, $R_S$ may be 0.180 or less. 0.150 or less, or 0.120 or less, within the above-defined range. Meanwhile, $R_B$ may be 0.146-1.000. Particularly. $R_B$ may be 0.156 or more within the above-defined range. In addition. $R_B$ may be 0.600 or less, 0.500 or less, 0.350 or less, or 0.244 or less, within the above-defined range. According to another embodiment of the present disclosure, $R_B$ may be 0.146-0.6.

A degree of crystallization (R) of the Raman spectrum close to 0 corresponds to a perfect crystal structure, while an R value close to 1 suggests a large amount of defects. Therefore, when R approaches 1, reactions between such defects and an electrolyte are increased, resulting in side effects, such as degradation of life characteristics. For this, it is required to control the R value within an adequate range.

In another aspect, there is provided a negative electrode including the negative electrode active material. According to the present disclosure, the negative electrode may include the above-described negative electrode active material, a conductive material and a binder resin. The negative electrode may be obtained by applying slurry prepared by mixing the above-mentioned ingredients with an organic solvent onto a negative electrode current collector, followed by drying and pressing.

According to an embodiment of the present disclosure, the negative electrode includes the negative electrode active material in an amount of 80 wt % or more, or 90 wt % or more, based on 100 wt % of the total negative electrode active material. According to another embodiment of the present disclosure, the negative electrode may include at least one metallic compound-based active material as a supplementary negative electrode active material in addition to the above-described negative electrode active material. Particular examples of such supplementary negative electrode active material include: lithium metal; lithium alloy; silicon-based alloy; silicon-based composite oxide; titanium oxide; lithium titanium oxide; or the like. The supplementary negative electrode active material may be added in an amount of 1-10 wt % based on 100 wt % of the total negative electrode active material. Preferably, the supplementary negative electrode active material includes a silicon-containing silicon composite oxide and/or lithium titanium oxide. In addition, according to the present disclosure, the supplementary negative electrode active material preferably has a particle diameter ($D_{50}$) of 4-11 µm.

According to the present disclosure, the conductive material may be any conventional conductive material used for manufacturing an electrode. Non-limiting examples of the conductive material include any one selected from carbon nanotubes, acetylene black, carbon black, natural graphite, artificial graphite, ketjen black and carbon black, or a combination of two or more of them. According to the present disclosure, the conductive material has a particle diameter of 1-100 µm, preferably 3-30 µm. When the particle diameter of the conductive material is smaller than the above-defined range, it is difficult to control generation of aggregates of conductive material particles. Meanwhile, when the particle diameter of the conductive material is larger than the above-defined range, phase stability of slurry may be degraded undesirably.

Particularly, the conductive material may be carbon nanotubes (CNT). Carbon nanotubes are excellent in terms of strength, heat conductivity, heat stability and copper conductivity. However, such characteristics can be accomplished when carbon nanotubes are distributed homogeneously and carbon nanotubes are in contact with an active material to the highest degree. Therefore, there is a need for carbon nanotubes to be isolated as much as possible, i.e., to be distributed without aggregation.

The dispersion medium used for preparing negative electrode slurry for a secondary battery according to an embodiment of the present disclosure is not particularly limited, as long as it dissolves a thickener suitably. For example, the dispersion medium that may be used includes an aqueous dispersion medium, such as water or an organic solvent as which can be mixed homogeneously with water (lower alcohol or lower ketone), a non-aqueous dispersion medium, such as N-methyl pyrrolidone (NMP), or the like.

According to an embodiment of the present disclosure, the binder polymer may be at least one selected from the group consisting of styrene-butadiene rubber (SBR), polyvinylidene fluoride (PVdF), polyhexafluoropropylene-co-polyvinylidene fluoride (PVdF-co-HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene (PTFE), polyvinyl chloride, polyacrylonitrile, polyvinyl pyridine, acrylonitrile-butadiene rubber and ethylene propylene diene monomer (EPDM). More preferably, the binder polymer may be styrene-butadiene rubber (SBR).

The styrene-butadiene rubber has strong adhesion to provide an effect as a binder even in a small amount, and is suitable for manufacturing an aqueous electrode by combining carboxymethyl cellulose having high water solubility and good properties as a thickener with styrene-butadiene rubber as a binder.

It is apparent to those skilled in the art that the content of each of the ingredients of slurry may be varied suitably depending on the characteristics of a negative electrode to be finished or a battery including the negative electrode without departing from the scope of the present disclosure. In addition, the negative electrode slurry according to the present disclosure may further include additives, such as a stabilizing agent, flame retardant, lubricant, antioxidant, plasticizer, dispersant and an antistatic agent, within the acceptable range.

According to an embodiment of the present disclosure, the lithium secondary battery includes a positive electrode, a negative electrode and a separator interposed between the negative electrode and the positive electrode.

The negative electrode may be obtained by applying and drying the above-described negative electrode slurry on a negative electrode current collector. The negative electrode current collector may be any metal having high conductivity, as long as it allows easy adhesion of a negative electrode mixture and shows no reactivity within the voltage range of an electrochemical device. Although there is no particular limitation in the current collector, particular examples of the current collector that may be used include stainless steel, aluminum, nickel, titanium, baked carbon, or aluminum or stainless steel surface-treated with carbon, nickel, titanium, silver, or the like. In addition, the current collector may have fine surface irregularities formed on the surface thereof to increase the adhesion of a negative electrode active material, and may have various shapes, such as a film, sheet, foil, net, porous body, foam or non-woven web body. Particularly, the current collector may be foil prepared by using aluminum, nickel or a combination thereof, or a stack of substrates made of the above-mentioned materials.

The positive electrode may be obtained by applying and drying a mixture of a positive electrode active material, a conductive material and a binder on a positive electrode current collector. If desired, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals: lithium manganese oxides such as those represented by the chemical formula of $Li_{1+x}Mn_yNi_{1-y-z}O_2$ (wherein x is 0-0.5, z<1, y<1 and z+y<1), those represented by the chemical formula of $Li_{1+x}Mn_{-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ or $Cu_2V_2O_7$; Ni-site type lithium nickel oxides represented by the chemical formula of Li $Ni_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like.

In general, the positive electrode current collector is formed to have a thickness of 3-500 μm. The positive electrode current collector is not particularly limited, as long as it causes no chemical change in the corresponding battery and has high conductivity. Particular examples of the positive electrode current collector may include stainless steel, aluminum, nickel, titanium, baked carbon, copper, stainless steel surface-treated with carbon, nickel, titanium or silver, or the like. It is possible to increase the adhesion of a positive electrode active material by forming fine surface irregularities on the surface of a current collector. The positive electrode current collector may have various shapes, such as a film, sheet, foil, net, porous body, foam and a non-woven web body.

The binder for a positive electrode active material is an ingredient which assists the binding between an active material with a conductive material and the binding to a current collector. In general, the binder is added in an amount of 1-50 wt % based on the total weight of the positive electrode mixture. The binder may be high-molecular weight polyacrylonitrile-co-acrylate, but is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene-butyrene rubber, fluororubber, various copolymers, or the like.

The separator is interposed between the positive electrode and the negative electrode, and may be an insulating thin film having high ion permeability and mechanical strength. In general, the separator may have a pore diameter and thickness of 0.01-10 μm and 5-300 μm, respectively. Particular examples of the separator include: olefinic polymers, such as polypropylene having chemical resistance and hydrophobicity; sheets or non-woven webs made of glass fibers or polyethylene; or the like.

The secondary battery according to the present disclosure may be obtained by introducing and sealing an electrode assembly formed by stacking the positive electrode and negative electrode alternately with the separator interposed therebetween into a casing material, such as a battery casing, together with an electrolyte. Any conventional methods for manufacturing secondary batteries may be used with no particular limitation.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$. $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), an ester compound or a combination thereof. However, the present disclosure is not limited thereto.

According to an embodiment of the present disclosure, the negative electrode may include a negative electrode active material layer in which the first and the second negative electrode active materials are mixed with each other with a homogeneous distribution, or a negative electrode active material layer formed by stacking one or more of the first negative electrode active material layer including the first negative electrode active material alternately with one or more of the second negative electrode active material layer including the second negative electrode active material.

In another aspect, there are provided a battery module including the secondary battery as a unit cell, and a battery pack including the battery module. Since the battery module and battery pack include a secondary battery which shows excellent quick charging characteristics at a high loading amount, they may be used as power sources for electric vehicles, hybrid electric vehicles, Plug-In hybrid electric vehicles and power storage systems.

MODE FOR DISCLOSURE

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

(1) Manufacture of Battery

TABLE 1

|  | Ex. 1 | Ex. 2 | Ex. 3 | Comp. Ex. 1 | Comp. Ex. 2 | Comp. Ex. 3 |
|---|---|---|---|---|---|---|
| First graphite particles ($D_{50}$) | 20.3 | 20.1 | 20.2 | 20.3 | 20.2 | 20.1 |
| Second graphite particles ($D_{50}$) | 10.6 | 10.4 | 10.5 | 12 | 12.1 | 12 |
| Particle diameter ($D_{50}$) of first graphite particles/particle diameter ($D_{50}$) of second graphite particles | 1.92 | 1.93 | 1.92 | 1.69 | 1.67 | 1.68 |
| Content ratio of first particles and second particles (based on weight ratios) | 50:50 | 50:50 | 50:50 | 50:50 | 50:50 | 50:50 |

A negative electrode active material, a conductive material (Super P), carboxymethyl cellulose (CMS) and styrene butadiene rubber (SBR) were introduced to distilled water at a ratio of 95.6:1.0:1.1:2.3 and mixed therein to obtain negative electrode slurry. In each of Examples and Comparative Examples, artificial graphite was used as a negative electrode active material, and the particle diameter and content ratio thereof are shown in the above Table 1 in detail. The slurry was coated uniformly onto a copper thin film with a thickness of 20 μm. The coating was carried out at an electrode drying temperature of 80° C. and coating rate of 0.2 m/min. The resultant electrode was adjusted to a target thickness by pressing it to a porosity of 28% by using a roll press system. Then, the electrode was dried in a vacuum oven at 130° C. for 8 hours. As a counter electrode, lithium metal with a thickness of 150 μm was used. The electrodes were used to assemble a coin half-cell. An electrolyte was injected to the cell and the cell was allowed to stand for 30 hours so that the electrolyte might infiltrate into the electrodes.

The electrolyte includes an organic solvent containing ethylene carbonate and ethyl methyl carbonate mixed at a weight ratio of 3:7 and further includes 0.5 wt % of vinylene carbonate and LOM of $LiPF_6$ dissolved in the organic solvent. Then, the cell was charged in a constant current/constant voltage (CC/CV) mode under the condition of 0.1 C, 5 mV and 0.005 C cut, and discharged in a CC mode at 0.1 C to 1.5 V. The charging/discharging, was carried out for 3 cycles.

(2) Quick Charging Test

Each of the batteries according to Comparative Examples was charged to a SOC (state-of-charge) of 75% and each of the batteries according to Examples was charged to a SOC of 80% in a CC mode at 1.6 C. Then, each battery was allowed to stand for 1-2 hours. The results are shown in FIGS. 1a to 1d. It can be seen that each of the batteries according to Examples shows a longer plateau as compared to each of the batteries according to Comparative Examples. This suggests that each of the batteries according to Examples is better in terms of quick charging characteristics.

Meanwhile, the difference in SOC between Comparative Examples and Examples does not affect determination of a plateau.

(3) Determination of Particle Size Distribution

Figure 1A:
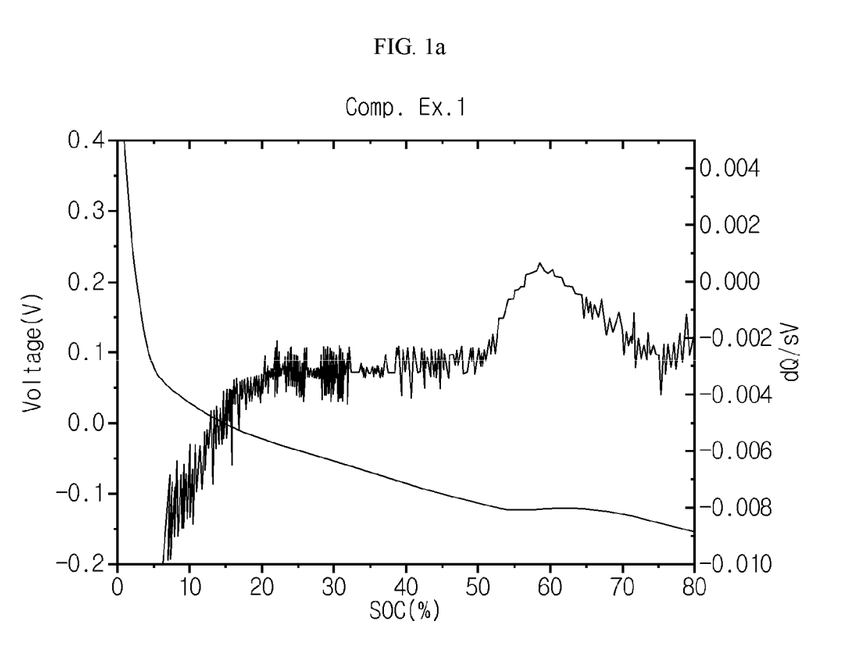
FIGS. 1a to 1d are graphs illustrating the quick charging characteristics of each of the batteries according to Examples and Comparative Examples.
Figure 1B:
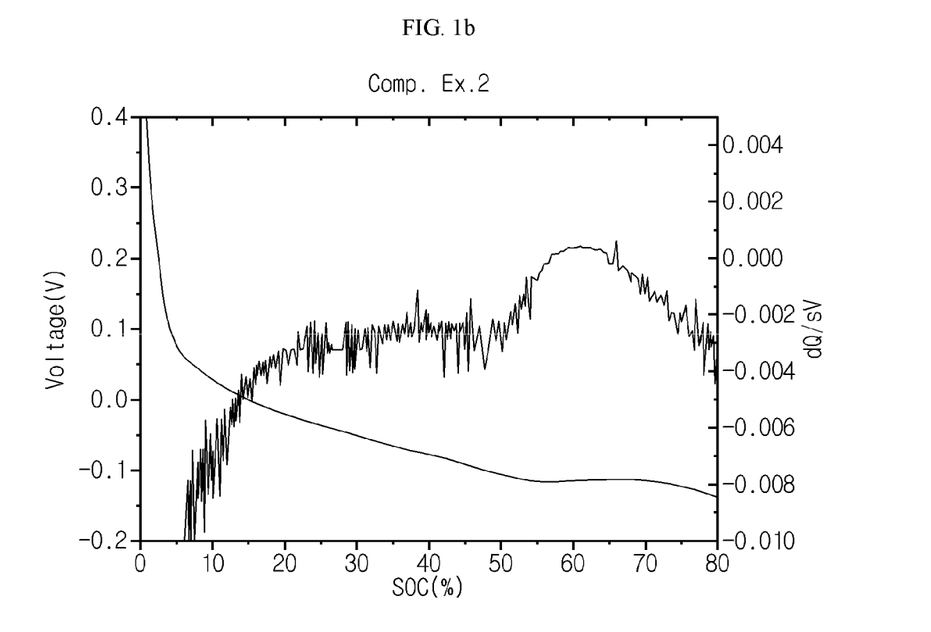
Figure 1C:
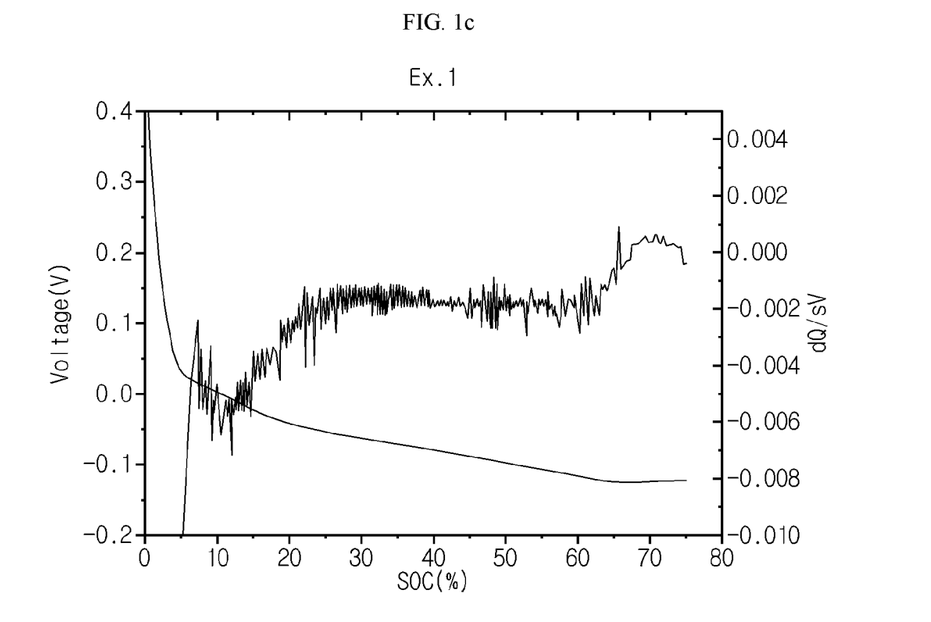
Figure 1D:
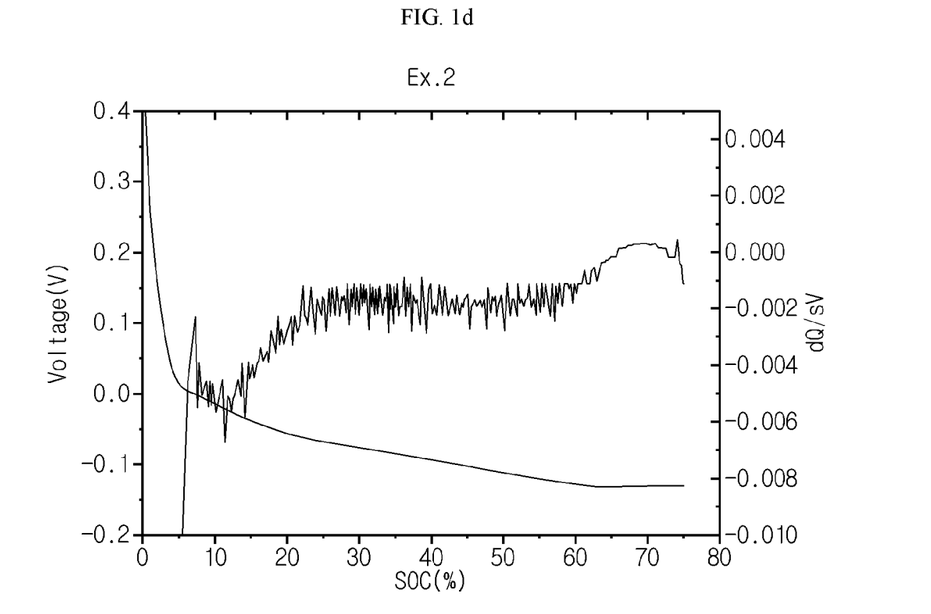
Figure 2:
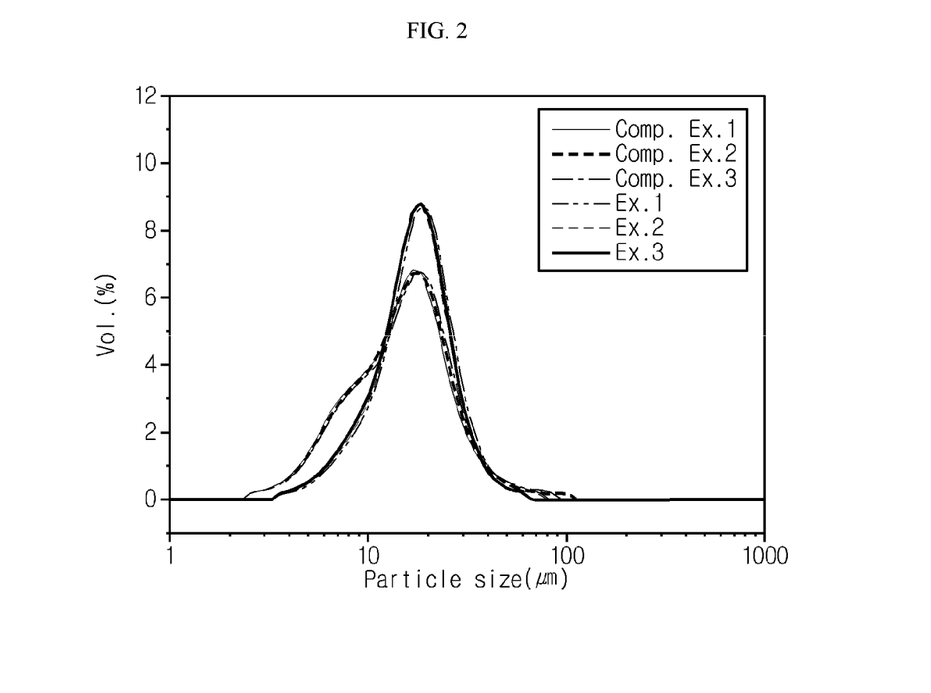
FIG. 2 illustrates the particle size distribution of each of the negative electrode active materials according to Examples and Comparative Examples.

Each of the negative electrode active materials prepared as described above was taken in an amount of about 0.3 g, introduced to distilled water mixed with a dispersing agent, and then shaken to perform dispersion. Then, a solution containing each negative electrode material dispersed homogeneously therein was prepared through sonication and was determined for particle size distribution by using Microtrac 3500. The results are shown in FIG. 2. It can be observed that each of Examples 1-3 shows peaks of the second graphite particles at a particle size of 10 nm or less and peaks of the first graphite particles at a particle size larger than 10 nm. This suggests that the negative electrode active material according to the present disclosure has a bimodal distribution. However, such a clear bimodal distribution cannot be observed in the case of Comparative Examples 1-3.

(4) Determination of Orientation Index of Negative Electrode

Each of the electrodes according to Examples and Comparative Examples was cut into a circular shape with an area of 1.4875 $cm^2$ and analyzed by using an X-ray diffractometer (XRD Cu-KA. Bruker D4 Endeavor) to determine the orientation index of each of the negative electrode active materials according to Examples and Comparative Examples. Herein, the orientation index means an area ratio ((004 surface)/(110 surface)) as determined by analyzing (110) surface and (004) surface of each active material particles with XRD and integrating the peak intensities.

Figure 3:
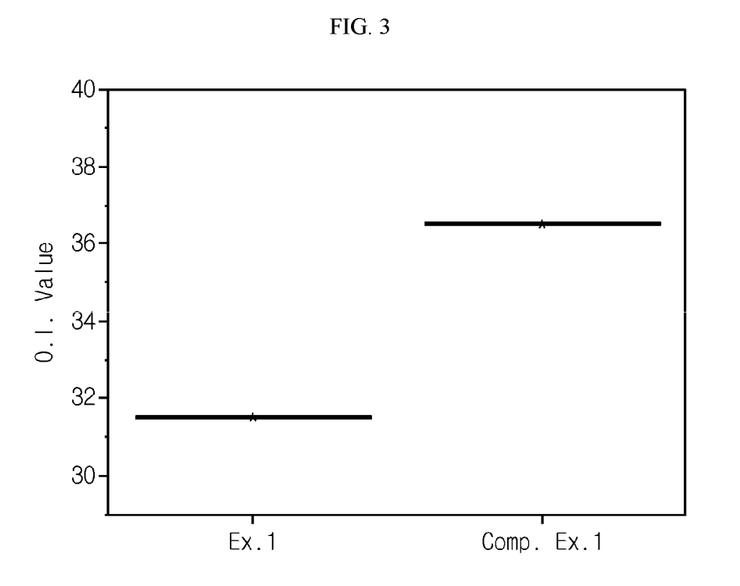
FIG. 3 illustrates the orientation index of each of the negative electrode active materials according to Examples and Comparative Examples.

The following Table 2 and FIG. 3 show the results of the orientation index of each of the negative electrodes according to Example 1 and Comparative Example 1. It can be seen from the results that Example 1 has an orientation index of 31, while Comparative Example 1 has an orientation index of 35, which is higher as compared to Example 1.

As the orientation index of an electrode is decreased, ion intercalation/deintercalation paths are increased, and thus Rct is reduced and quick charging characteristics are improved.

TABLE 2

|  | 004 Surface peak | 004 Surface peak area | 110 Surface peak | 110 Surface peak area | 004 Surface/110 surface Area ratio |
|---|---|---|---|---|---|
| Ex. 1 | 54.71 | 8,816.1 | 77.6 | 281.0 | 31 |
| Comp. Ex. 1 | 54.70 | 8,795.9 | 77.6 | 249.1 | 35 |

(5) Raman Spectroscopy

Figure 4:
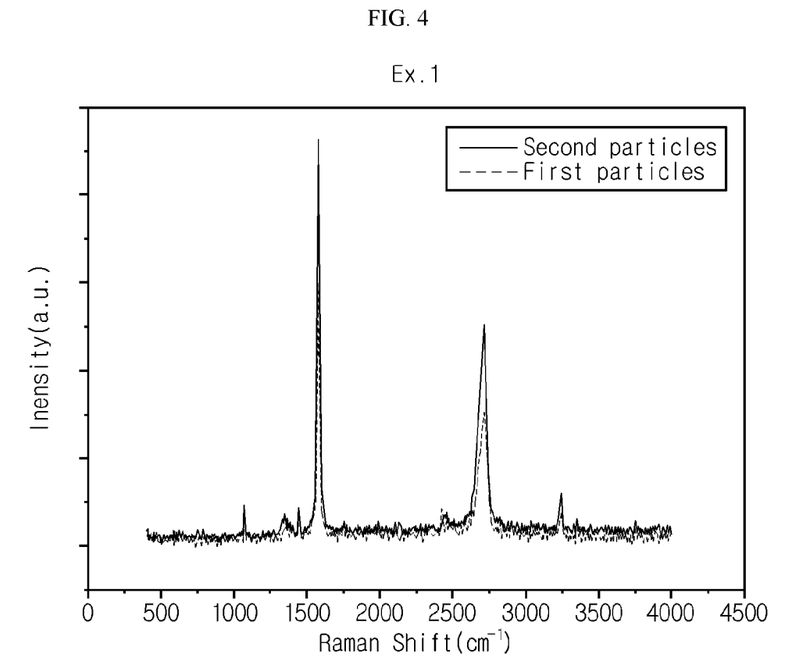
FIGS. 4 and 5 show the results of Raman spectroscopy of each of the negative electrode active materials according to Examples and Comparative Examples.
Figure 5:
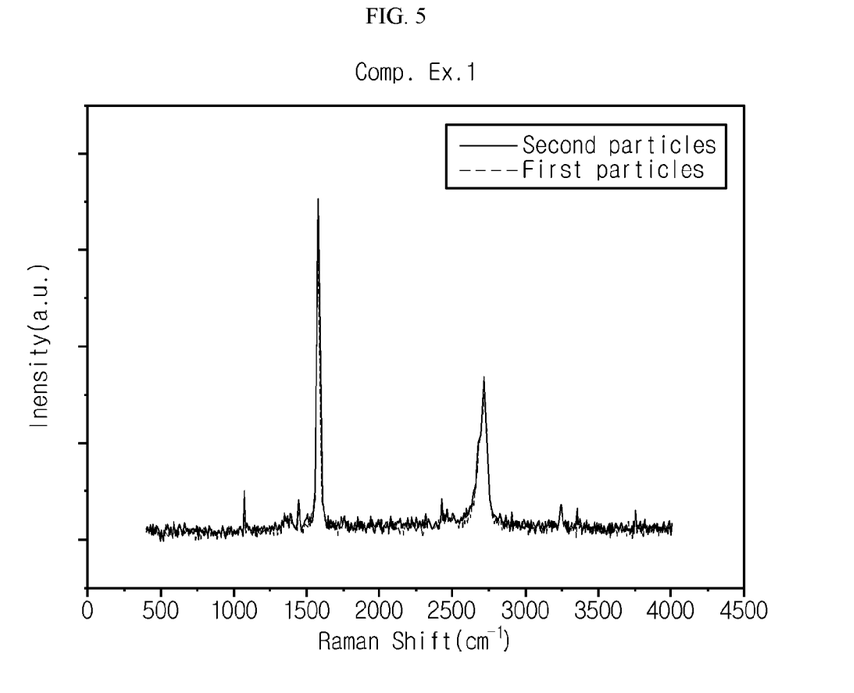

Each of the electrode active materials according to Example 1 and Comparative Example 1 was used to carry out Raman spectroscopy. Example 1 and Comparative Example 1 have the same large particle diameter but are different in small particle diameter. Raman spectroscopy was carried out by using a dispersive Raman system (Nicolet Almega XR) with an Ar laser as a laser source. It is measured under a condition of 1 second of a sample acquisition time and 10 times of accumulation. FIG. 4 shows the results of Raman spectroscopy of Example 1 and FIG. 5 shows the results of Raman spectroscopy of Comparative Example 1. Example 1 and Comparative Example 1 have the same $R_B$ of 0.16, while Example 1 has a $R_S$ value of 0.08 and Comparative Example 1 has a $R_S$ value of 0.13. Then, $R_R$ value of each of Example 1 and Comparative Example 1 was calculated from the above data. As a result, Example 1 has a $R_R$ value of 0.47 and Comparative Example 1 has a $R_R$ value of 0.82. The following Table 3 shows the results of Raman spectroscopy of Examples 1-3 and Comparative Examples 1-3.

TABLE 3

|       | Ex. 1 | Ex. 2 | Ex. 3 | Comp. Ex. 1 | Comp. Ex. 2 | Comp. Ex. 3 |
|-------|-------|-------|-------|-------------|-------------|-------------|
| $R_B$ | 0.16  | 0.16  | 0.16  | 0.16        | 0.16        | 0.16        |
| $R_S$ | 0.08  | 0.05  | 0.05  | 0.13        | 0.14        | 0.15        |
| $R_R$ | 0.47  | 0.31  | 0.31  | 0.82        | 0.88        | 0.88        |

What is claimed is:

1. A negative electrode active material for an electrochemical device, comprising:
    first graphite particles, wherein the first graphite particles have an average particle diameter ($D_{50}$) of 15 μm to 25 μm; and
    second graphite particles, wherein the second graphite particles have an average particle diameter ($D_{50}$) of 4 μm to 11 μm,
    wherein the first graphite particles and the second graphite particles have a bimodal distribution, and a ratio of the average particle diameter ($D_{50}$) of the first graphite particles to the average particle diameter ($D_{50}$) of the second graphite particles is larger than 1.7,
    wherein $R_S$ and $R_B$ are ratios ($R_R$) of D band peak intensity (1358 cm$^{-1}$) to G band peak intensity (1580 cm$^{-1}$) showing a degree of crystallization in Raman spectroscopy, wherein a ratio $R_S$ of the second graphite particles to $R_B$ of the first graphite particles, $R_S/R_B$, is 0.03-0.82.

2. The negative electrode active material for the electrochemical device according to claim 1,
    wherein the first and the second graphite particles have an orientation index of less than 35,
    wherein the orientation index is defined as an area ratio of a (004) surface to a (110) surface, wherein the (110) surface and (004) surface of the particles are measured with X-ray diffractometry integration of peak intensities from the X-ray diffractometry.

3. The negative electrode active material for the electrochemical device according to claim 1, wherein the ratio of ($R_R$) is 0.19-0.60.

4. The negative electrode active material for the electrochemical device according to claim 1, wherein the ratio of $R_S/R_B$ is 0.03-0.82, and $R_S$ is 0.03-0.200.

5. The negative electrode active material for the electrochemical device according to claim 1, wherein the ratio of $R_S/R_B$ is 0.03-0.82, and $R_B$ is 0.146-1.000.

6. The negative electrode active material for the electrochemical device according to claim 1, wherein the first graphite particles are present in an amount of 50 wt % to 99 wt % based on 100 wt % of the negative electrode active material.

7. The negative electrode active material for the electrochemical device according to claim 1, wherein the first graphite particles have a specific surface area of 0.01 m$^2$/g to 1.9 m$^2$/g.

8. The negative electrode active material for the electrochemical device according to claim 1, wherein the second graphite particles have a specific surface area of 0.05 m$^2$/g to 2.6 m$^2$/g.

9. The negative electrode active material for the electrochemical device according to claim 1, wherein each of the first graphite particle and the second graphite particle is independently at least one selected from the group consisting of natural graphite, artificial graphite, graphitized carbon fibers, graphitized mesocarbon microbeads and amorphous carbon.

10. A negative electrode for an electrochemical device comprising the negative electrode active material as defined in claim 1.

11. The negative electrode for the electrochemical device according to claim 10, which has an orientation index, defined by an area ratio ((004 surface)/(110 surface)) of the first and the second graphite particles contained in the negative electrode, less than 35.

12. An electrochemical device comprising:
    a positive electrode;
    a negative electrode; and
    a separator interposed between the positive electrode and the negative electrode,
    wherein the negative electrode comprises the negative electrode active material as defined in claim 1.

* * * * *